US012774694B2

(12) United States Patent
Sidenmark

(10) Patent No.: US 12,774,694 B2
(45) Date of Patent: Oct. 27, 2026

(54) BUOY, WAVE ENERGY CONVERTER COMPRISING SUCH BUOY AND METHOD OF MANUFACTURING A BUOY

(71) Applicant: Ocean Harvesting Technologies AB, Karlskrona (SE)

(72) Inventor: Mikael Sidenmark, Listerby (SE)

(73) Assignee: Ocean Harvesting Technologies AB, Karlskrona (SE)

( * ) Notice: Subject to any disclaimer, the term of this patent is extended or adjusted under 35 U.S.C. 154(b) by 215 days.

(21) Appl. No.: 18/025,119

(22) PCT Filed: Sep. 7, 2021

(86) PCT No.: PCT/SE2021/050855
§ 371 (c)(1),
(2) Date: Mar. 7, 2023

(87) PCT Pub. No.: WO2022/050892
PCT Pub. Date: Mar. 10, 2022

(65) Prior Publication Data

US 2023/0323850 A1 Oct. 12, 2023

(30) Foreign Application Priority Data

Sep. 7, 2020 (SE) .................................... 2051052-5

(51) Int. Cl.
*B63B 22/14* (2006.01)
*F03B 13/18* (2006.01)
*B63B 22/04* (2006.01)

(52) U.S. Cl.
CPC .......... *F03B 13/1865* (2013.01); *B63B 22/14* (2013.01); *B63B 22/04* (2013.01);
(Continued)

(58) Field of Classification Search
CPC ..... B63B 22/04; B63B 22/14; B63B 2221/10; B63B 2241/08; Y10T 29/49993
See application file for complete search history.

(56) References Cited

U.S. PATENT DOCUMENTS 3,799,093 A 3/1974 Thomson
3,893,201 A 7/1975 Mallory
(Continued)

FOREIGN PATENT DOCUMENTS

CN 203740100 U 7/2014
CN 106050539 A 10/2016
(Continued)

OTHER PUBLICATIONS

PCT Search Report and Written Opinion for PCT/SE2021/050855 dated Nov. 10, 2021, (17 pages).
(Continued)

*Primary Examiner* — Jermie E Cozart
(74) *Attorney, Agent, or Firm* — Reising Ethington P.C.

(57) ABSTRACT

A buoy for a wave energy converter system comprises an attachment portion and a plurality of buoyancy block assemblies supported by support portions. By providing the support portions so that they form an integral support structure, an improved buoy design is provided which is easier to manufacture and which exhibits reduced weight and
(Continued)

improved durability. A wave energy converter comprising the buoy and method of manufacturing a buoy are also provided.

17 Claims, 11 Drawing Sheets

(52) U.S. Cl.
CPC ....... *B63B 2221/10* (2013.01); *B63B 2241/08* (2013.01); *Y10T 29/49993* (2015.01)

(56) References Cited

U.S. PATENT DOCUMENTS

| | | | |
|---|---|---|---|
| 4,548,153 | A | 10/1985 | Watchorn |
| 5,215,027 | A | 6/1993 | Baxter |
| 6,503,112 | B1 | 1/2003 | Chadwick et al. |
| 2010/0084869 | A1 | 4/2010 | Leijon et al. |
| 2010/0171312 | A1 | 7/2010 | Burns |
| 2017/0226984 | A1 | 8/2017 | Gregory |
| 2019/0211797 | A1 | 7/2019 | Viselli et al. |
| 2019/0285044 | A1 | 9/2019 | Dragic |

FOREIGN PATENT DOCUMENTS

| | | | | | |
|---|---|---|---|---|---|
| CN | 206054166 | U | | 3/2017 | |
| CN | 208665488 | U | | 3/2019 | |
| GB | 485173 | A | | 5/1938 | |
| GB | 860032 | A | | 2/1961 | |
| GB | 2003523 | A | | 3/1979 | |
| KR | 20090056400 | A | | 6/2009 | |
| KR | 101364165 | B1 | | 2/2014 | |
| KR | 101419188 | B1 | | 7/2014 | |
| KR | 101487804 | B1 | | 1/2015 | |
| KR | 20190087804 | A | | 7/2019 | |
| NL | 8802377 | A | * | 4/1990 | ............ B63B 35/38 |
| WO | WO2011140196 | A2 | | 11/2011 | |
| WO | WO2020091605 | A1 | | 5/2020 | |

OTHER PUBLICATIONS

EP Extended Search Report for EP Serial No. 21864811.1 dated Apr. 23, 2025 (7 pages).

* cited by examiner

BUOY, WAVE ENERGY CONVERTER COMPRISING SUCH BUOY AND METHOD OF MANUFACTURING A BUOY

TECHNICAL FIELD

The present disclosure relates generally to wave energy conversion and more particularly to a buoy and a method of manufacturing such a buoy.

BACKGROUND

Different types of wave energy converters (WEC's) have been proposed, in which a buoy or other forms of prime movers interacts with the wave to create a force and motion, which is used by the power take-off system to extract energy.

The buoy is typically a large structure and thus represents a significant part of the overall cost of a wave energy converter. Present designs use a hull made from steel, concrete or composite materials, which is hollow inside. Such designs are costly and often heavy due to pressure variations when the buoy moves up and down in the water column, and especially when the buoy is submerged in large waves, requiring reinforcements to prevent buckling in the hull. It is also a challenge to ensure there is no water ingress over time, causing it to lose buoyancy and ultimately sink.

SUMMARY

An object of at least some implementations of the present disclosure is to provide an improved design of a buoy/prime mover for a wave energy converter.

The disclosure is based on the insight that a buoy can be made of concrete with an integral support structure between adjacent buoyancy block assemblies made from solid material.

According to a first aspect of the disclosure, a buoy for a wave energy converter system is provided, the buoy having a top, sides and a bottom, the buoy comprising an attachment portion; a plurality of buoyancy blocks assemblies supported by support portions, being characterized in that the support portions form an integral support structure made of concrete, preferably reinforced concrete, wherein the buoyancy block assemblies have any of the following cross-sectional shapes: hexagonal, square, and rectangular, and wherein the support structure comprises walls between adjacent buoyancy block assemblies.

Since the buoyancy block assemblies have square, rectangular, or hexagonal cross-sectional shape in the support structure, a geometrical shape is allowed that utilizes the space in the buoy in an efficient way. The solid internal structure of the buoy prevents buckling from pressure variations of the water outside the buoy, and the entire structure and shell can be manufactured in a molding process as a single part, similar to common construction work, ones the buoyancy blocks and any reinforcements are in place. This makes the buoy lighter and more cost efficient compared to hollow buoy designs with air inside.

In a preferred embodiment, the buoy comprises a shell, preferably made of the same material as the support portions, with a side section on the buoy side, a top section on the buoy top and preferably a bottom section on the buoy bottom.

In a preferred embodiment, the support portions comprise support walls, preferably 25-50 mm thick support walls.

In a preferred embodiment, a plurality of support walls extend radially from the attachment portion to engage with attachment portion buoyancy block assemblies.

In a preferred embodiment, the buoyancy block assemblies are made of Expanded polystyrene (EPS) or extruded polystyrene (XPS) foam.

In a preferred embodiment, a plurality of, and preferably twelve diagonal support stays extend radially from a bottom part of the attachment portion to the top of the shell side section, the diagonal support stays preferably being in the form of wires or reinforcement bars, preferably stainless, or made of basalt, glass or carbon fiber or composite material with corrosion resistant properties. Each diagonal support stay preferably runs through a thin shell/pipe, allowing the stay to move inside the shell, and the stay being attached to the shell side section by means of a bolt and nut, enabling tensioning of the support stay.

In a preferred embodiment, the attachment portion comprises a pipe, preferably a central pipe in an essentially circular buoy, the pipe being wide enough to allow a loop end of a link rope to pass through.

In a preferred embodiment, a plurality of attachment portions is provided. This allows for a wave energy converter with a plurality of power take offs.

In a preferred embodiment, the attachment portion comprises a bell mouth opening with a channel with a gradually increasing diameter towards the open end thereof and attachment means, preferably a pin device, for a chain, wire, rope or flexible pipe. The bell mouth opening may a lowered bell mouth extending below the bottom section of the shell. The bell mouth opening decreases the wear of the mooring rope.

In a preferred embodiment, the buoy has a diameter of between 9 and 18 meters, preferably 12 meters.

In a preferred embodiment, the buoy has a height of between 2 and 6 meters, preferably 3.7 meters.

In a preferred embodiment, the buoy is essentially circular and has a volume between 150 and 1500 $m^3$, preferably 400 $m^3$ or the buoy is elongated and has a volume between 1200 and 12000 $m^3$, preferably 3200 $m^3$.

In a preferred embodiment, the buoy is elongated and preferably comprises a plurality of attachment portions, preferably an even number of attachment portions, preferably eight attachment portions. Alternatively, the buoy is essentially circular and preferably comprises a plurality of attachment portions, preferably three attachment portions, the attachment portions preferably being provided evenly spaced at the same distance from a center point of the buoy.

In a preferred embodiment, the buoyancy block assemblies are each made up of twelve triangular sub-blocks with 30/60/90 degrees angle. Alternatively, the buoyancy block assemblies are each made up of four triangular sub-blocks with 30/60/90 degrees angle, and four equilateral triangular blocks.

In a preferred embodiment, the buoyancy block assemblies are provided with indentations, grooves or other features allowing the concrete or other supporting material to engage the surface of the buoyancy block assemblies.

According to a second aspect of the disclosure, a wave energy converter is provided comprising a buoy as described above attached to a power take off unit, preferably by means of a link rope, and a mooring rope connecting a bottom end of the power take off unit to a seabed foundation.

In a preferred embodiment, the wave energy converter comprises a rope wear protection, preferably in the form of wear protection rings, provided around the link rope. The rope wear protection may also be is in the form of a bending restrictor.

In a preferred embodiment, the wave energy converter comprises a plurality of power take off units, preferably three power take off units, each connected to the same buoy, and preferably to individual sea floor foundations by means of a respective mooring rope. Alternatively, the wave energy converter comprises a plurality of power take off units, preferably eight power take off units, each connected to the same elongated buoy, and preferably to individual sea floor foundations by means of a respective mooring rope.

According to a third aspect of the disclosure, a method of manufacturing a buoy is provided comprising the following steps: providing a mold, placing at least one attachment portion in the mold, placing a plurality of buoyancy block assemblies in the mold, wherein at least some of the buoyancy block assemblies are placed with spaces between adjacent buoyancy block assemblies, and supplying supporting material in liquid form to the mold, wherein, when solidified, the supporting material forms an integral support structure in the spaces between buoyancy block assemblies.

In a preferred embodiment, the method comprises the additional step of: providing a shell bottom in the mold, wherein the step of placing a plurality of buoyancy block assemblies in the mold comprises fixing the buoyancy block assemblies to the shell bottom, preferably by means of mounting glue.

In a preferred embodiment, the supporting material additionally forms a shell on the side and/or top of the buoy.

In a preferred embodiment, the supporting material is concrete, preferably reinforced concrete, high strength concrete, or a combination thereof.

In a preferred embodiment, the buoyancy block assemblies are assembled from sub-blocks provided by cutting a rectangular block into 30/60/90 degrees angled triangular sub-blocks or into two 30/60/90 degrees angled triangular sub-blocks and one equilateral triangular sub-block. Alternatively, the buoyancy block assemblies are provided by cutting a rectangular block into a hexagon.

BRIEF DESCRIPTION OF THE DRAWINGS

The disclosure is now described, by way of example, with reference to the accompanying drawings, in which.

DETAILED DESCRIPTION

In the following, an improved design of a buoy/prime mover in a Wave Energy Converter (WEC) system will be described in detail.

When references are made to directions, such as "up" or "top", these refer to the directions shown in the figures, i.e., after installation of the WEC unit at sea. When referring to a "buoyancy block assembly", it is meant the buoyancy material in a single cell of the support structure. A buoyancy block assembly can consist of several buoyancy sub-blocks put together but may also refer to a single block of buoyancy material cut into a desired shape.

Figure 1:
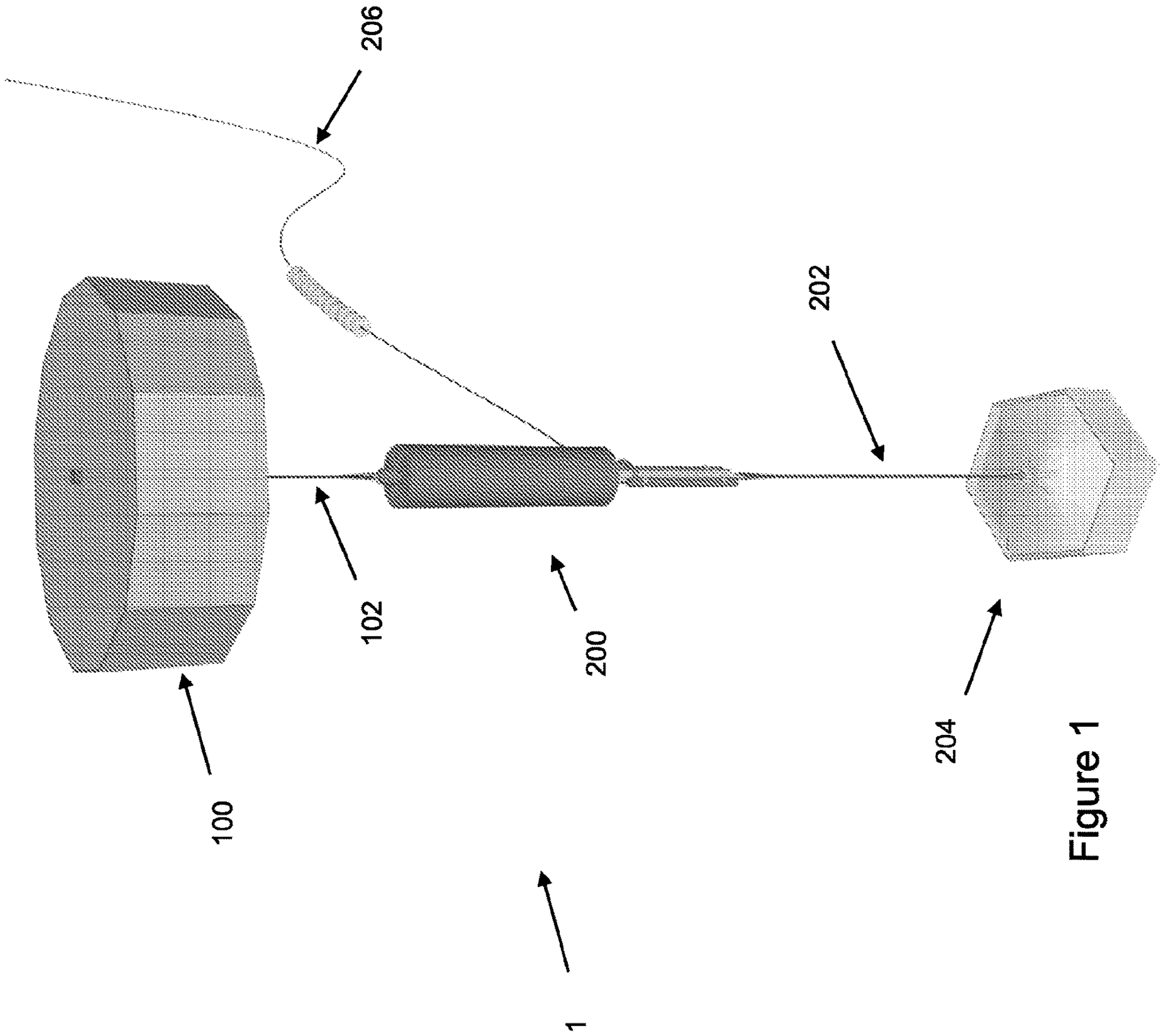
FIG. 1 shows a complete single WEC unit with buoy, PTO and sea floor foundation.

FIG. 1 shows a complete wave energy converter (WEC) unit, generally designated 1, with an essentially cylindrical shaped buoy 100 attached to a power take off (PTO) unit 200, preferably by means of a link rope 102, providing tensile stiffness and bending flexibility. A mooring rope 202 connects the bottom end of the PTO unit 200 to a seabed foundation 204. The PTO unit 200 is the part of the WEC 1 that converts motion of the buoy to electricity by means of a generator connected to a linear actuation system, arranged to apply a force on the buoy through the link rope 102, preferably a PTO unit 200 according to patent WO2020055320A1. During operation, power is exported from the PTO unit 200 by means of an export power cable 206 connected to the PTO unit 200.

It should be realized that the link rope 102 can be any of the following, chain, wire, rope or flexible pipe. In an alternative embodiment, not shown in the figures, the buoy is attached to the PTO unit directly, preferably with a universal joint.

Figure 2A:
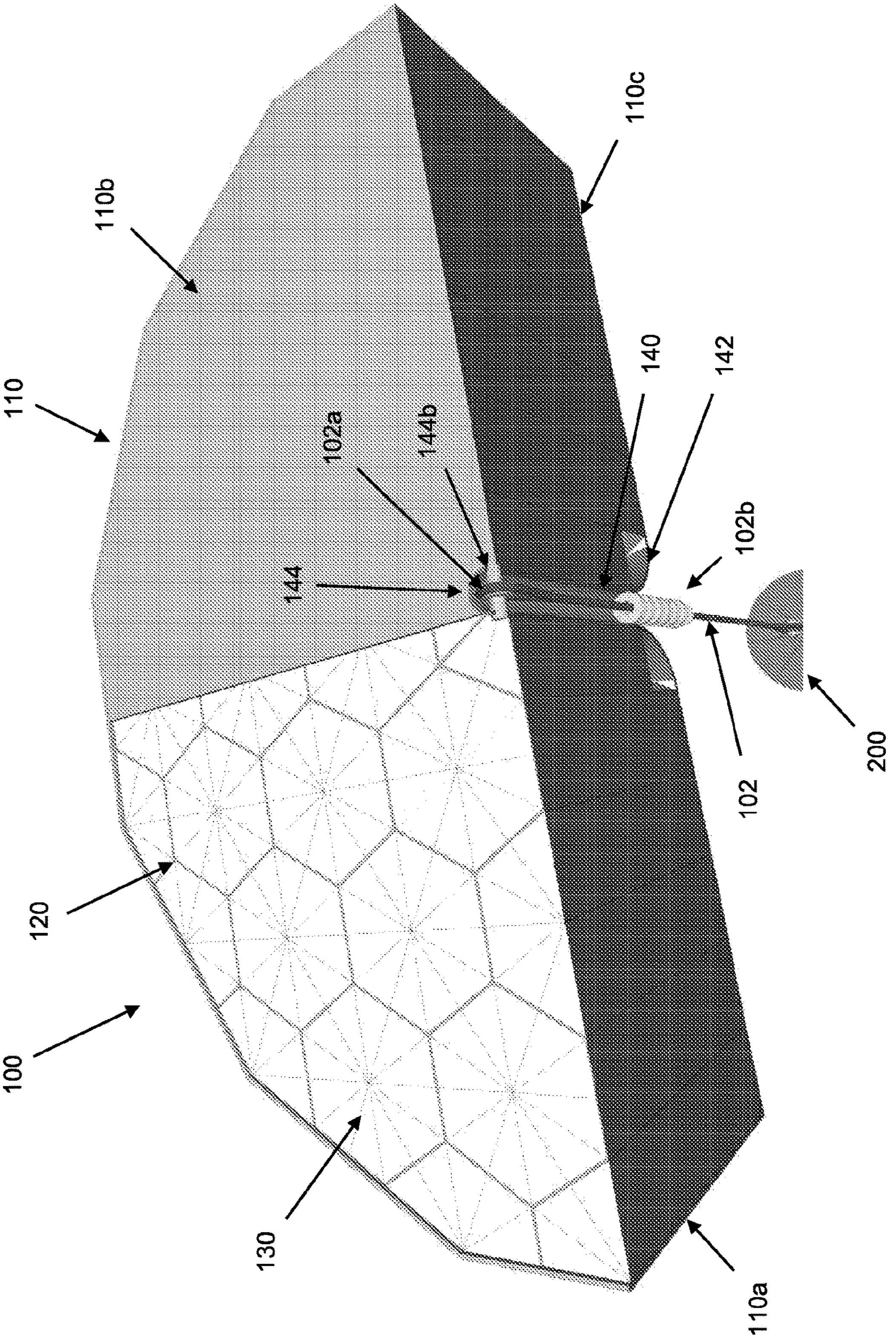
FIG. 2*a* shows a cross-sectional view of a buoy, with the integral support structure and buoyancy blocks, and a bell mouth and connection for the mooring rope in the center.
Figure 5B:
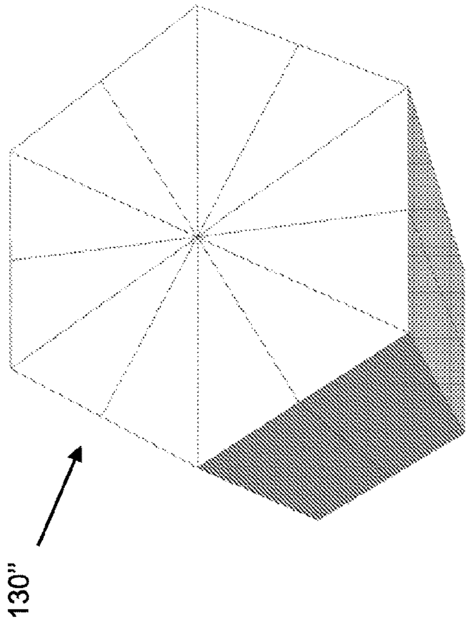
FIG. 5*b* shows a hexagonal assembly comprising 12 right-angled triangular blocks.
Figure 6:
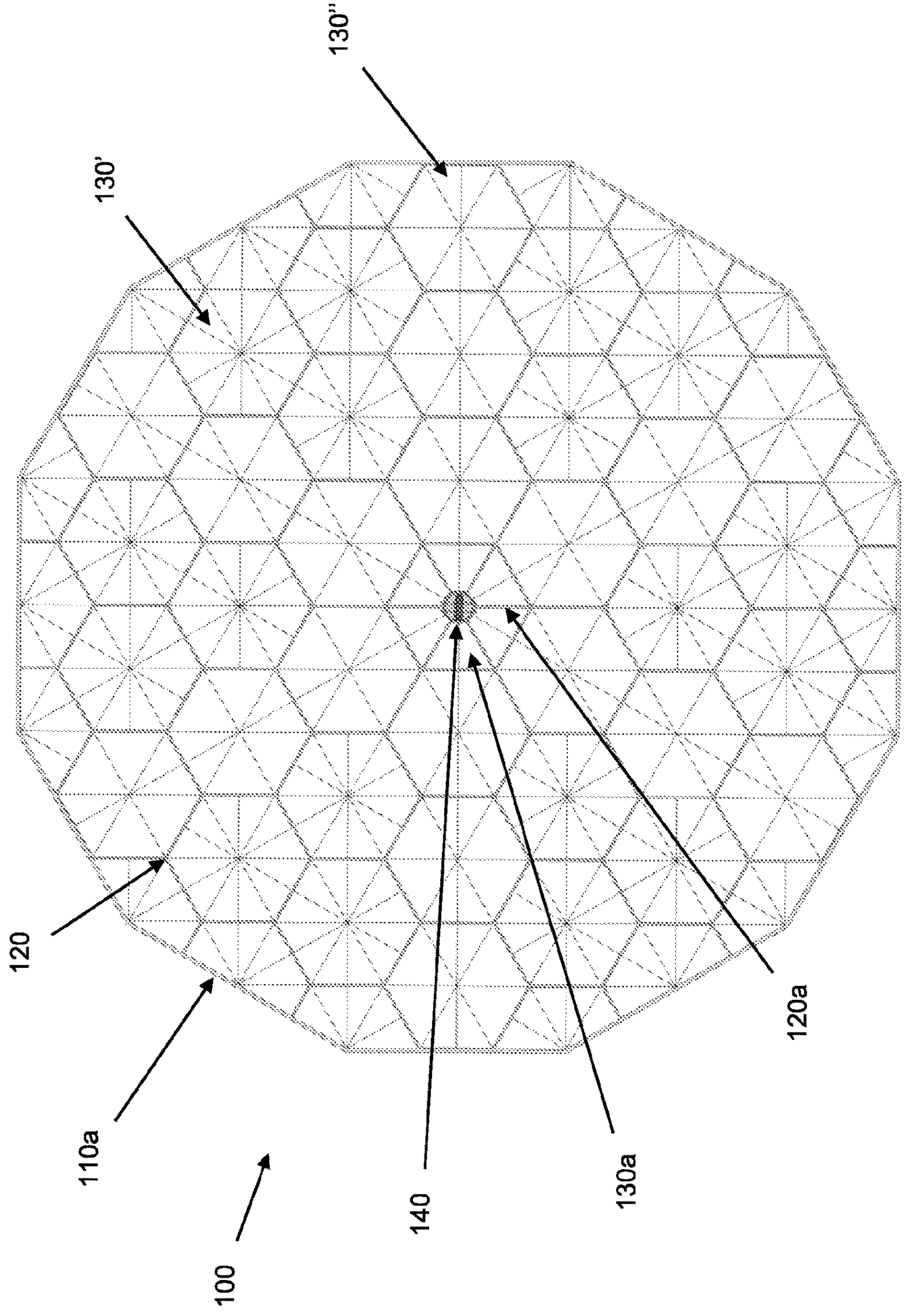
FIG. 6 shows the top view of the support structure and buoyancy blocks in a mix of hexagonal block assemblies according to FIG. 5*a* and FIG. 5*b*.

FIG. 2*a* shows a cross section view of the buoy 100, comprising a concrete shell 110 with sections on the buoy side 110*a*, buoy top 110*b* and buoy bottom 110*c*, and an integral support wall structure 120 around hexagonal buoyancy block assemblies 130 according to FIG. 5*b* forming a solid honeycomb core with "cells" inside the concrete shell. By the term "integral support structure" is meant that the support walls and the buoyancy block assemblies form a solid body inside the buoy shell. The buoyancy block 130*a*, see FIG. 6, is modified to incorporate support walls 120*a* extending radially from an attachment portion in the form of a pipe 140, in this embodiment a central pipe, to distribute the load point from the link rope 102 on top of the structure. It should be realized that support walls or reinforcement beams can be placed between each triangular buoyancy block, at the expense of a heavier support structure.

The pipe 140 opens into a bell mouth 142 at the bottom 110*c* of the buoy structure. More specifically, the bell mouth 142 is a channel with a gradually increasing diameter towards the open end thereof. The purpose of the bell mouth is to eliminate sharp bends and wear of the link rope 102, and also to eliminate movements in a Link rope attachment device 144 on top of the pipe, and the wear thereof. The diameter of the pipe 140 is wide enough to allow the link rope loop end 102*a* of the link rope 102 to pass through. In a preferred embodiment, a rope wear protection 102*b* in the form of wear protection rings, similar to a J-tube seal, are located around the link rope 102 to fill the gap between the rope and inside of the pipe, and to provide wear protection for the portion of the rope that will be in contact with the bell mouth during rolling and pitching motion of the buoy.

This arrangement allows the PTO unit 200 to be transported and installed separately from the buoy 100, to simplify the installation procedures of the WEC unit 1 and also make it possible to store the equipment more efficiently before installation and on an installation vessel.

During installation of the WEC 1, a guide rope (not shown) is placed through the bell mouth 142 of the buoy 100 before it is deployed in the water. The bottom end of the guide rope is then attached to the link rope 102 on the PTO unit 200, after which the link rope loop end 102*a* is pulled up through the bell mouth 140 and then easily secured by inserting a link rope pin 144*b* in the Link rope attachment device 144 from the top side 110*b* of the buoy 100.

Figure 5A:
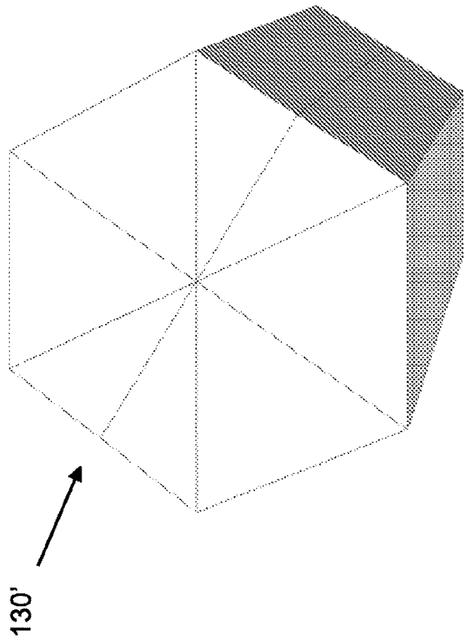
FIG. 5*a* shows a hexagonal assembly comprising 4 right-angled triangular blocks and 4 equilateral triangle blocks.

The concrete shell 110 and support wall 120 are made in a molding process, preferably at the site of deployment of the buoy into the sea. Rigid walls (not shown) are placed on a flat surface, to form a mold for the shell side 110*a* and bottom 110*c*. Concrete is poured into the mold to form the shell bottom 110*c*, preferably 30-100 mm thick. Once dry, buoyancy block assemblies 130 according to FIG. 5*a* or 5*b*, is then fixed to the bottom shell 110*c*, preferably with mounting glue, to form hexagonal cells with an even spacing between each cell for support walls, preferably 25-50 mm. The circumferential mold walls are positioned, preferably 50-100 mm from the buoyancy block assemblies 130, to form a gap for the shell side 110*a*. Finally, cement is poured over the structure to fill all gaps and to form the top shell, preferably 25-75 mm thick, and the support walls 120 between the buoyancy block assemblies 130.

To increase the strength of the structure, high-strength concrete can be used and reinforcement fibers can also be mixed in the cement, preferably made from basalt, glass or carbon fibers that are corrosion resistant to salt water, providing reinforced concrete. Alternatively, reinforcement mesh is placed around the buoyancy block assemblies and/or in the shell side, top and/or bottom prior to pouring the cement into the mold.

The complete essentially circular buoy structure preferably has a diameter of between 9 and 18 meters, preferably 12 meters, and a height between 2 and 6 meters, preferably 3.7 meters, with total volume between 150 $m^3$ and 1500 $m^3$, preferably 400 $m^3$. It should be realized that the exact diameter, height and volume is determined by the size of the buoyancy block assemblies 130, and that the size of the buoyancy blocks 130*a*, 130*b* can be altered to change the size of the buoy without changing the pattern of the integral structure.

Figure 2B:
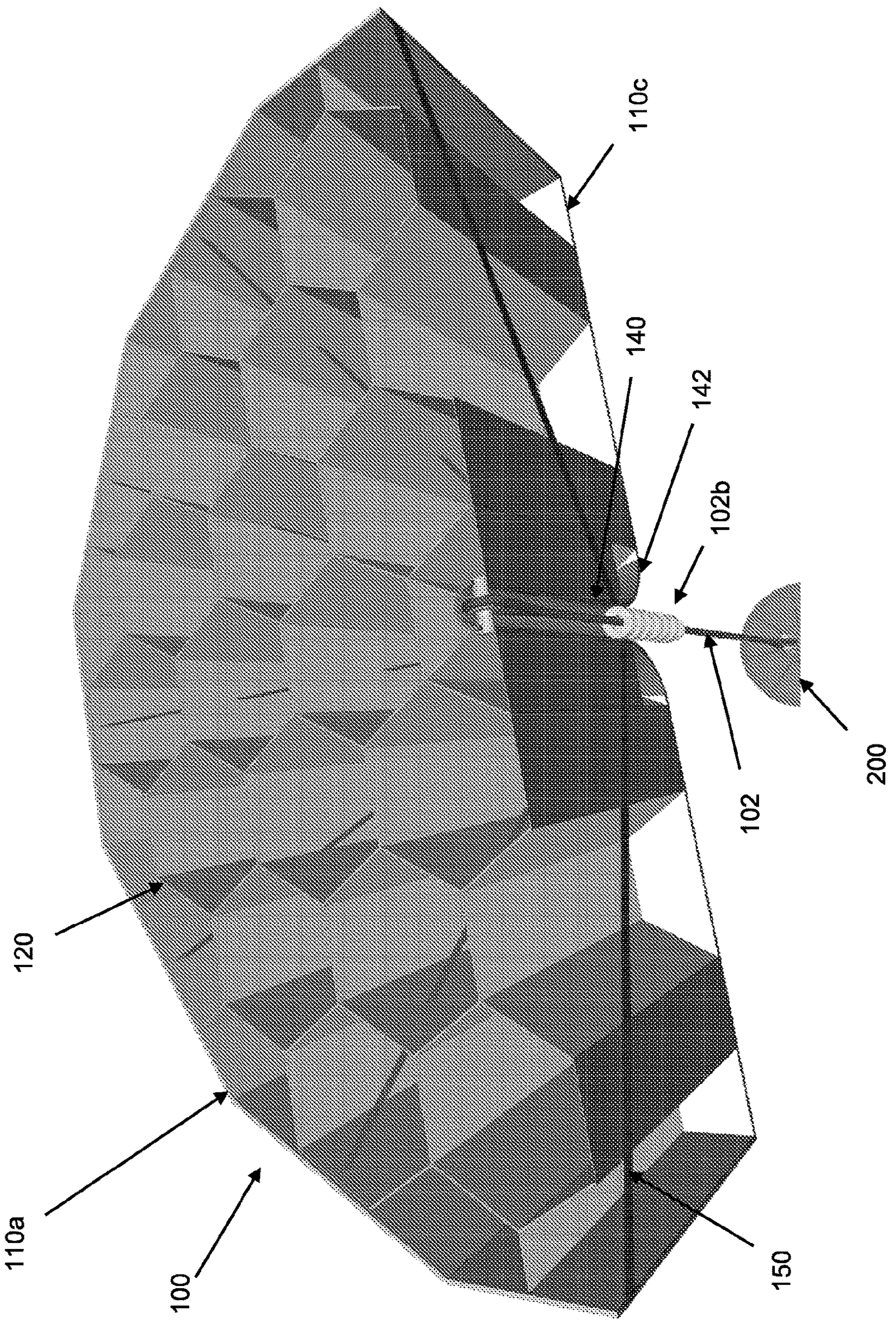
FIG. 2*b* shows a cross-sectional view of a buoy, with the integral support structure and diagonal support stays added between the center and the shell side.

FIG. 2*b* shows a cross section view of a buoy according to FIG. 2*a*, with the addition of diagonal support stays 150, extending radially from the bottom part of the pipe 140 for the link rope, to the top of the shell side 110*b*. Preferably twelve support stays 150 are arranged to go through the support walls 120 and between the triangular blocks in the hexagonal buoyancy block assemblies 130, not shown, preferably the support stays having a diameter smaller than the wall thickness, preferably having multiple stays stacked on top of each other to reach sufficient strength. The purpose of the diagonal support stays is to distribute part of the load from the center where the link rope 102 is attached, to the circumference of the buoy.

The support stays 150 are preferably in the form of wires or reinforcement bars, preferably stainless, or made of basalt, glass or carbon fiber, or composite material for the purpose of being corrosion resistant in salt water. The support stays are positioned before the mold process. In a preferred embodiment a thin shell/pipe is placed around the stays, to allow the support stays to move inside the shell once the mold is completed. Each stay is in this embodiment attached to a bolt at the shell side, allowing tensioning of the stays and thereby reduced maximum stress of the integral concrete walls when in use.

Figure 2C:
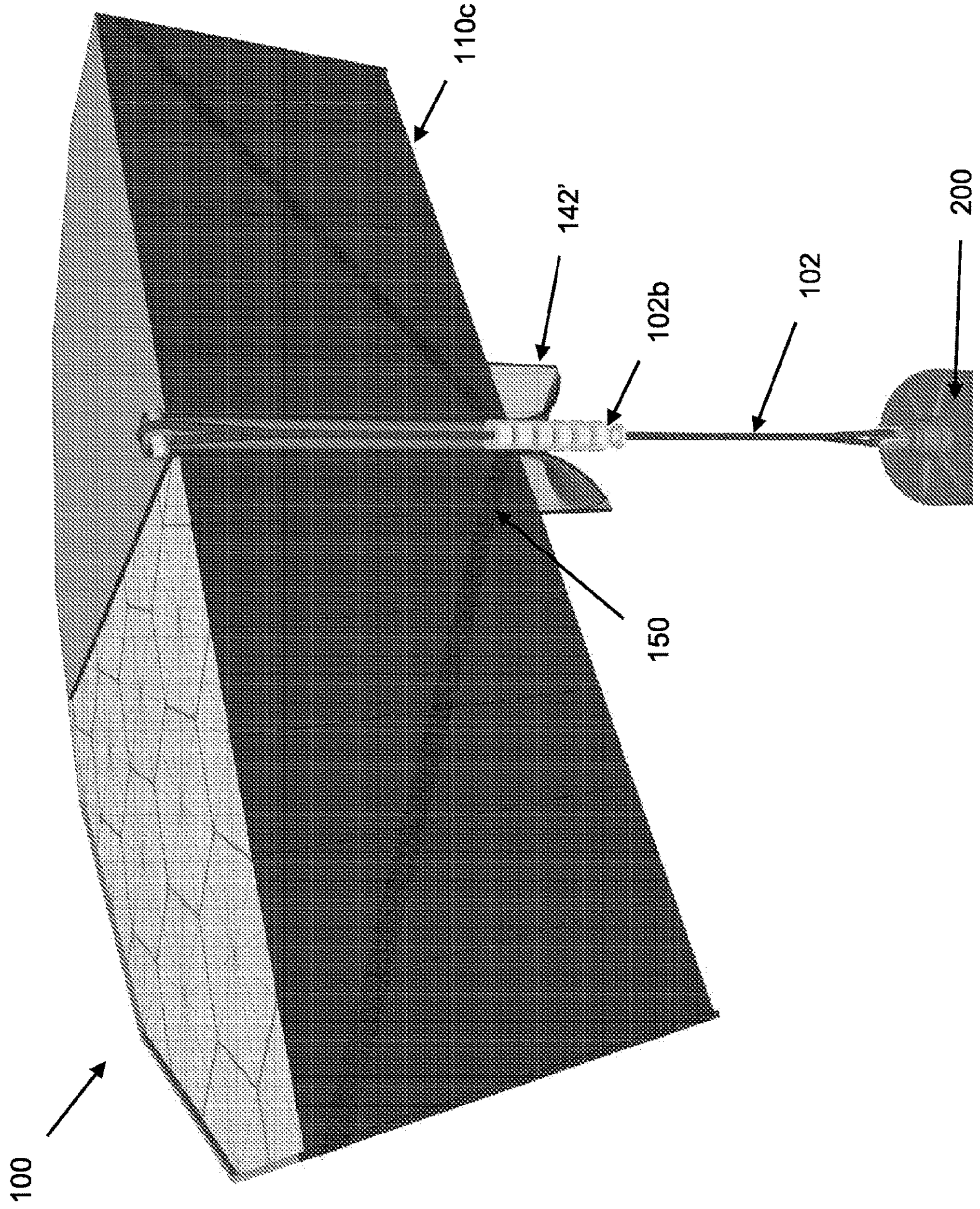
FIG. 2*c* shows a cross-sectional view of a buoy with a lowered bell mouth.

FIG. 2*c* shows a cross section view of a buoy 100 with a lowered bell mouth 142' extending below the shell bottom 110*c* of the buoy 100, with the purpose of lowering the point of contact of the link rope to the buoy structure, to reduce roll and tilt motion of the buoy. It should be realized that a rope wear protection 102*b* in the form of a bending restrictor can be used with or without the bell mouth, preferably having high bending stiffness to reduce roll and tilt motion of the buoy. It should also be realized that the buoy 100 can be directly attached to the PTO unit 200 with a universal joint, i.e., without the link rope.

Figure 2D:
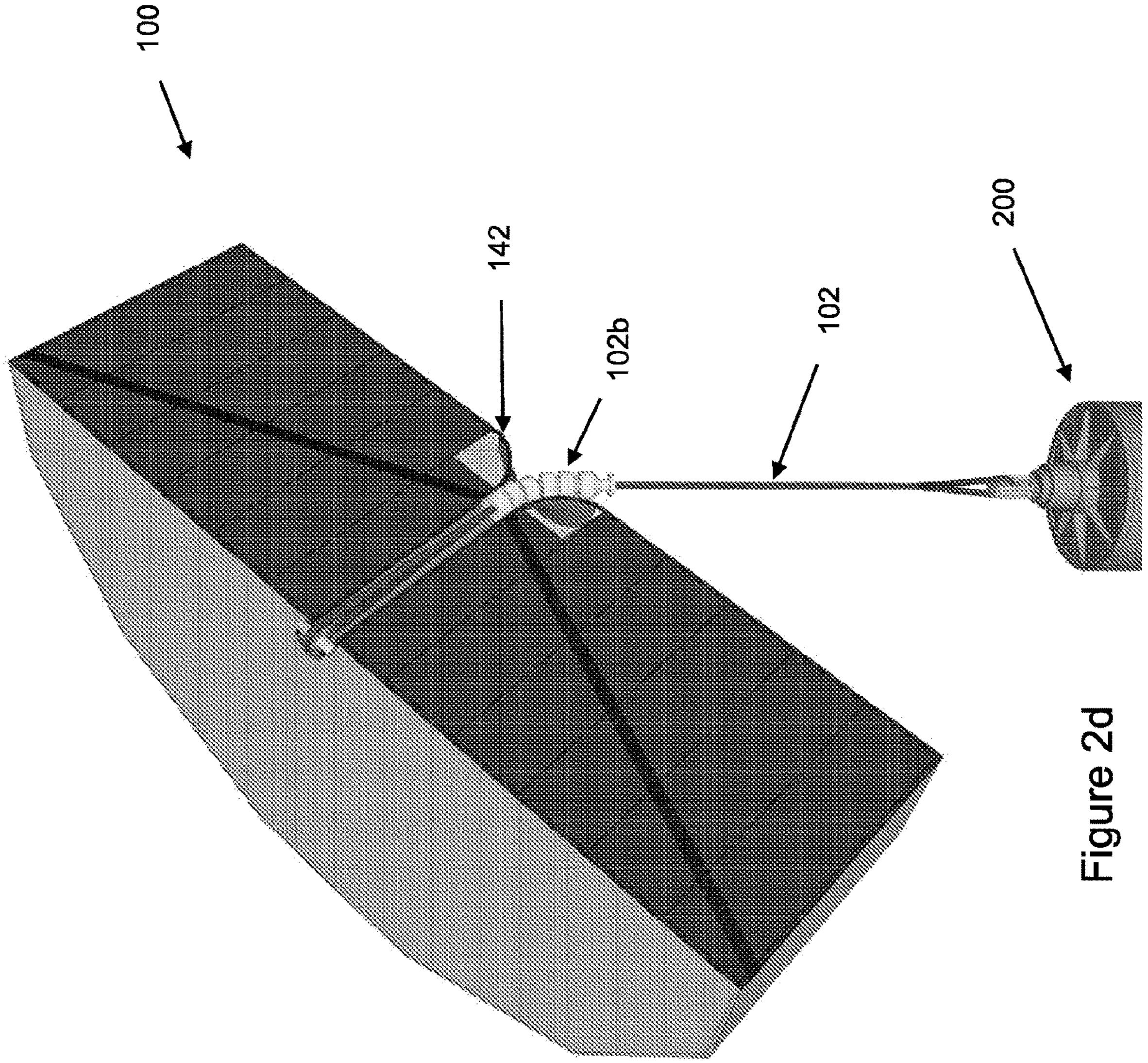
FIG. 2*d* shows a cross-sectional view of the link rope and wear protection position inside the bell mouth in a tilted buoy.

FIG. 2*d* shows a cross section view of a tilted buoy, and the position of the link rope 102 and wear protection ring 102*b* inside the bell mouth 142.

Figure 3A:
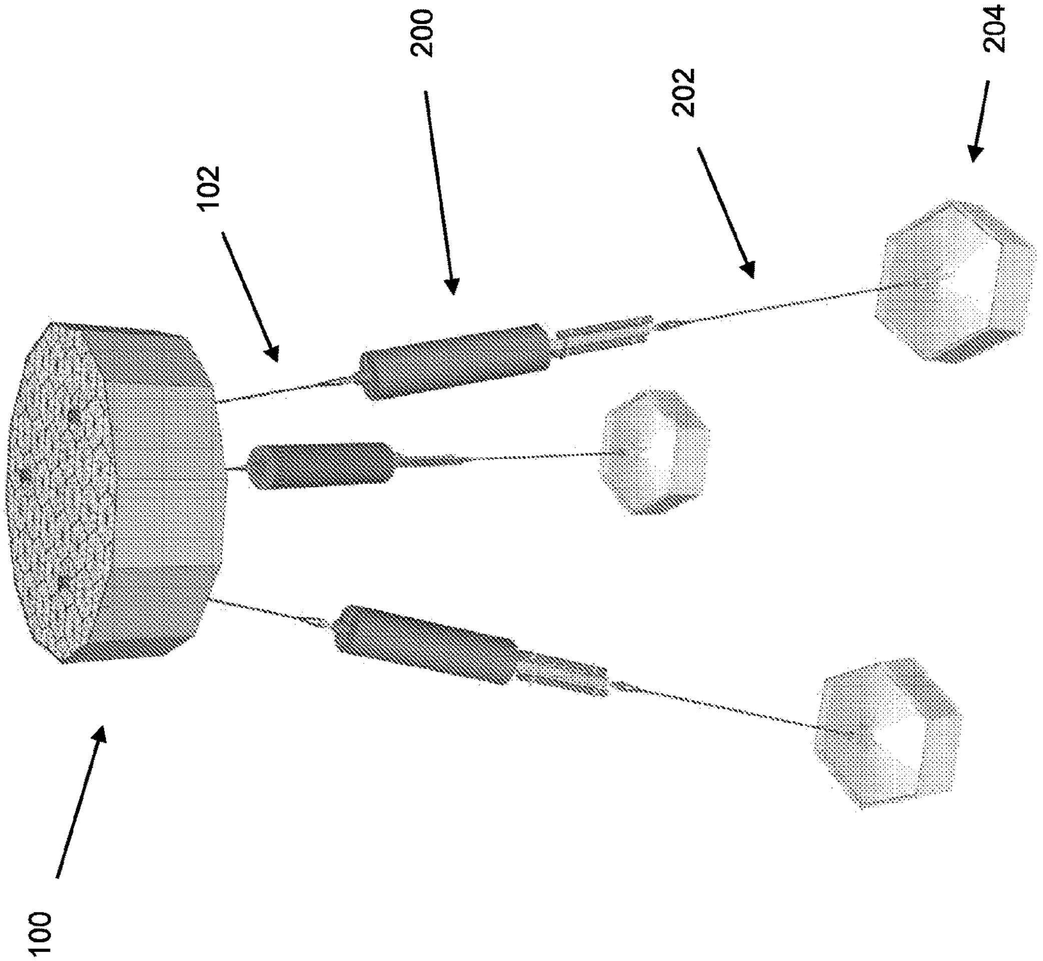
FIG. 3*a* shows a cylindrical buoy with three PTO modules.

FIG. 3*a* shows a view of a cylindrical buoy 100 with a plurality of PTO units 200, in this specific embodiment three PTO units 200, each connected to a sea floor foundation 204 by means of a respective mooring rope 202, whereby the mooring points are separated further apart than the connection points to the buoy, thus providing the capability to dampen also roll, pitch and surge motion of the buoy 100, so called multi-mode configuration. Thus, the buoy 100 comprises three attachment portions 140, which are provided evenly spaced at the same distance from a center point of the buoy 100. The connections to the buoy 100 from the PTO unit 200 each have the same hexagonal central block with link rope attachment 130*a*, according to FIG. 6.

Figure 3B:
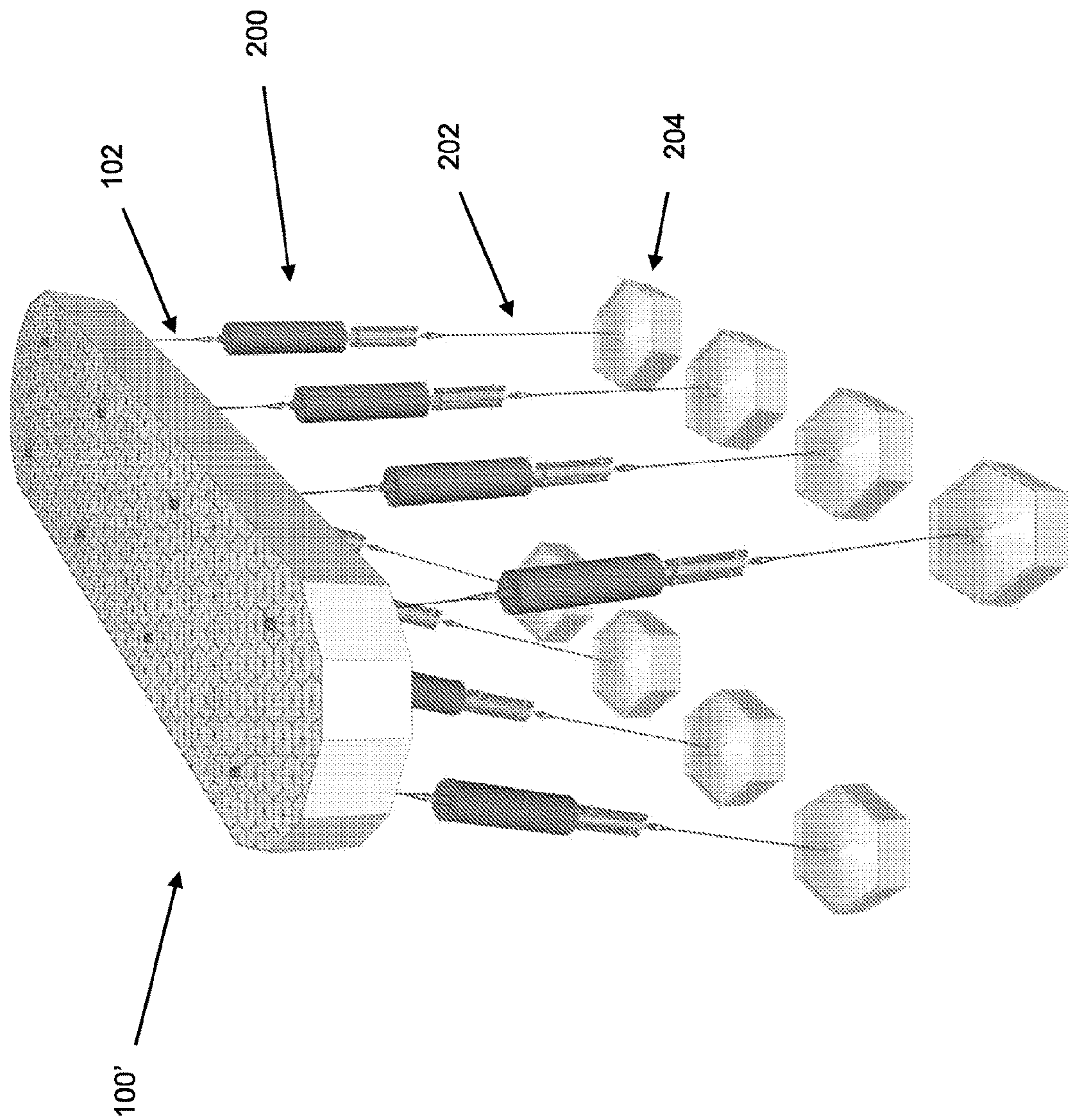
FIG. 3*b* shows an elongated buoy with eight PTO modules.

FIG. 3*b* shows a view of an elongated buoy 100', comprising the same integral support structure in the form of a honeycomb pattern and hexagonal buoyancy block assemblies 130, in which planar long sides are made possibly without waste of buoyancy material, by removing triangular blocks from the hexagonal block assemblies along the sides. Eight PTO units 200 are attached to the structure, forming a wave energy converter with much higher capacity, preferably oriented with the long side perpendicular to the main wave direction on the site where it is installed. An elongated buoy can be made with a larger volume as compared to an essentially circular buoy, such as eight times the volume. Thus, the elongated buoy 100' has in this embodiment a volume between 1200 $m^3$ and 12000 $m^3$, more preferably 3200 $m^3$.

FIGS. 2*a*-2*d* and 3*a*-3*b* show the flexibility of forming different shapes of the buoy by dividing each hexagonal buoyancy block assemblies into triangular blocks, and that any of the hexagonal buoyancy assemblies 130 can be replaced with a hexagonal central block with link rope attachment 130*a* for attachment with a PTO unit, to increase the capacity of the system by adding multiple PTO units to the same buoy, as well as add capabilities to dampen additional degrees of motion.

Figure 4C:
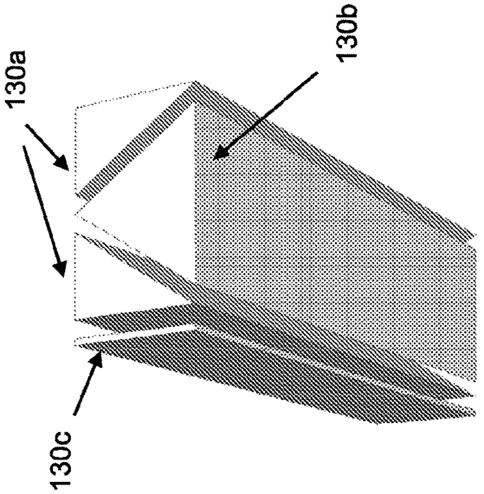
FIG. 4*c* shows the rectangular buoyancy block being cut into two 30/60/90 degree angled triangular blocks and one equilateral triangular block.
Figure 4B:
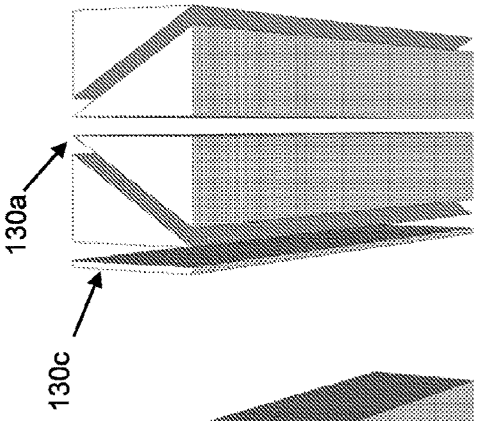
FIG. 4*b* shows the rectangular buoyancy block being cut into 30/60/90 degree angled triangular blocks.
Figure 4A:
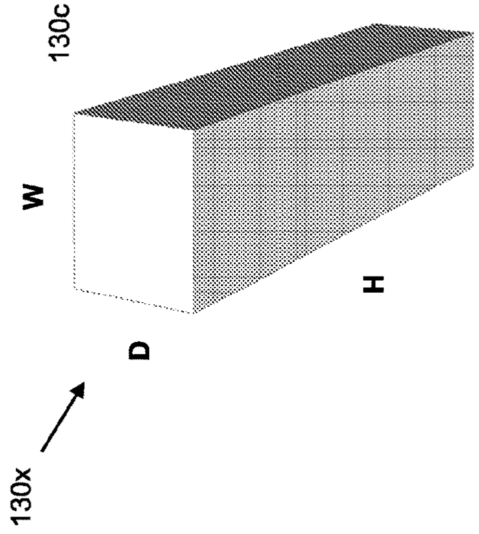
FIG. 4*a* shows a rectangular buoyancy block in a standard size.

FIG. 4*a* shows a rectangular buoyancy block 130*x* with size D×W×H, typically size 1.0×1.2×3.6 m is used in construction industry, preferably made from EPS (Expanded Polystyrene foam) or XPS (Extruded Polystyrene foam). EPS is a lightweight, rigid, closed-cell insulation available in various densities to withstand load and back-fill forces. XPS is a similar foam material offering improved surface roughness, higher stiffness, reduced water absorption and reduced thermal conductivity. From such standard size rectangular block, it is possible to cut any shape suitable to form the spacing for the support structure, preferably triangular, hexagonal or square shapes. FIG. 4*b* shows how a rectangular block in the mentioned standard size is cut into 30/60/90 degrees angled triangular sub-blocks 130*a*, with a small piece of waste 130*c* material from the standard block, which can be re-cycled in the block manufacturing. FIG. 4*c* shows how a standard block is cut into two 30/60/90 degree angled triangular sub-blocks 130*a* and one equilateral triangular sub-block 130*b* from the same rectangular block size. FIG. 5*a* shows a first hexagonal buoyancy block assembly 130' comprising twelve triangular sub-blocks 130*a* with 30/60/90 degrees angle, and FIG. 5*b* shows a second hexagonal block assembly 130" comprising four triangular sub-blocks 130*a* with 30/60/90 degrees angle, and four equilateral triangular sub-blocks 130*b*. The purpose of cutting the blocks like this is to enable the entire structure to be made from a single size of a standard rectangular buoyancy block, with a minimum waste of foam material. In this way, the buoyancy block assemblies in each cell of the buoy 100 can be made larger if made up of several sub-blocks, decreasing the weight of the support structure and thereby increasing the buoyancy of the buoy 100.

It should be realized that the waste of the foam material can be eliminated completely by adjusting the size of the rectangular block in the manufacturing, and that the diameter and height of the buoy 100 can be modified by changing the dimensions of the rectangular blocks. It should also be realized that the buoyancy blocks can be manufactured directly in a single size 30/60/90 degree angled triangular block, in which case no cutting is required, and no waste of material, to build any of the shown structures in FIGS. 2*a*-2*d* and 3*a*-3*b*.

FIG. 6 shows the top view of a complete buoy 100 with essentially cylindrical shape, comprising of a mix of hexagonal buoyancy block assemblies 130', 130" according to FIG. 5*a* and FIG. 5*b*, and also shows the complete view of the integral honeycomb support structure 120 and the extra walls 120*a* extending radially from the pipe 140 for the link rope in the central cell 130*a* with the link rope connection, forming a triangular support structure in the central cell for the mooring attachment, to better carry out the load from the link rope in the center to the honeycomb support wall 120.

Figure 7:
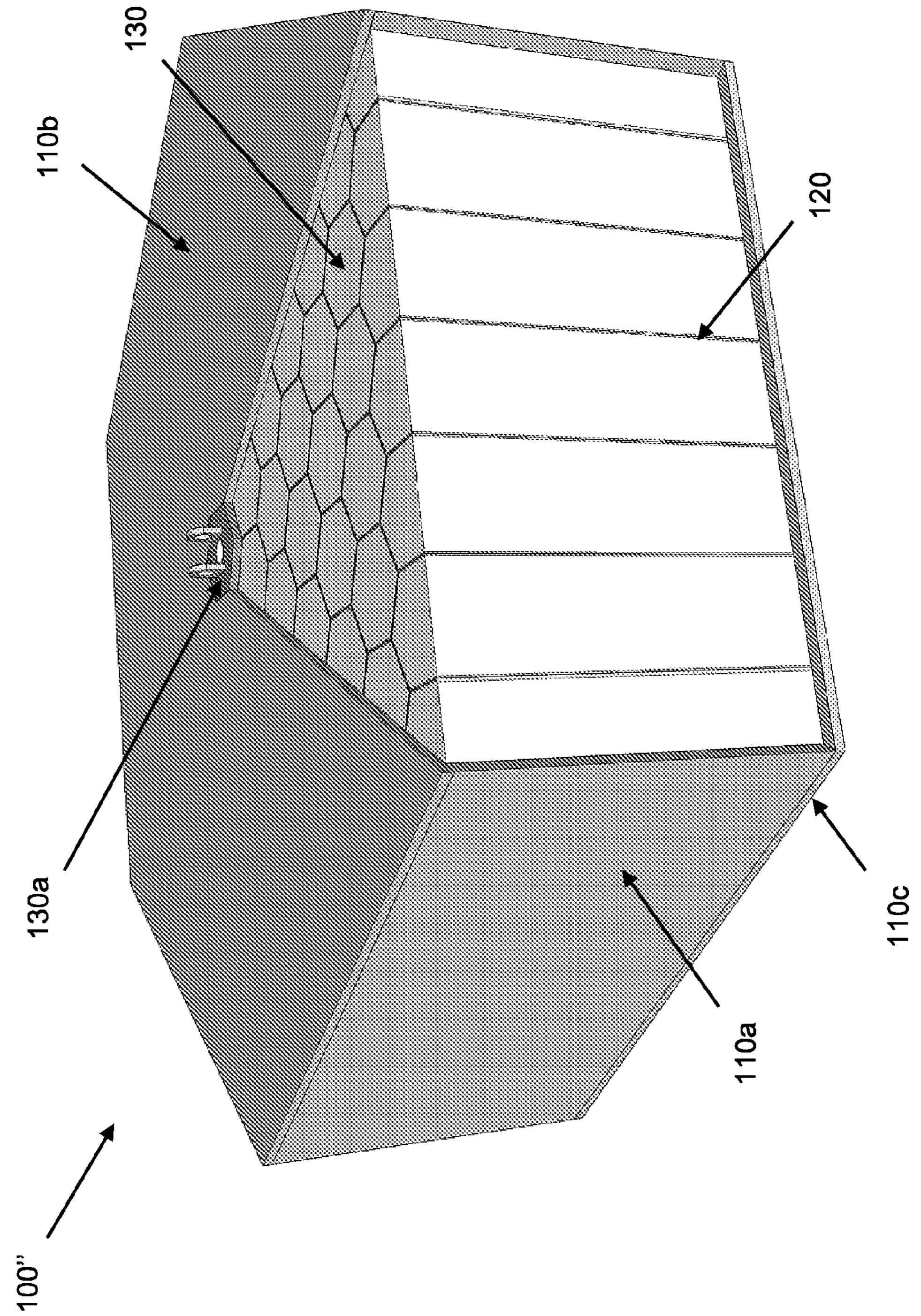
FIG. 7 shows a view of a buoy with reinforced concrete and buoyancy material with buoyancy block assemblies having hexagonal cross-sectional shape.

FIG. 7 shows an embodiment of the buoy 100" with the shape of a hexagon, having solid hexagonal buoyancy block assemblies 130 in the honeycomb sandwich structure with support walls 120, and with a shell comprising shell side 110*a*, shell top 110*b* and shell bottom 110*c*.

Figure 8:
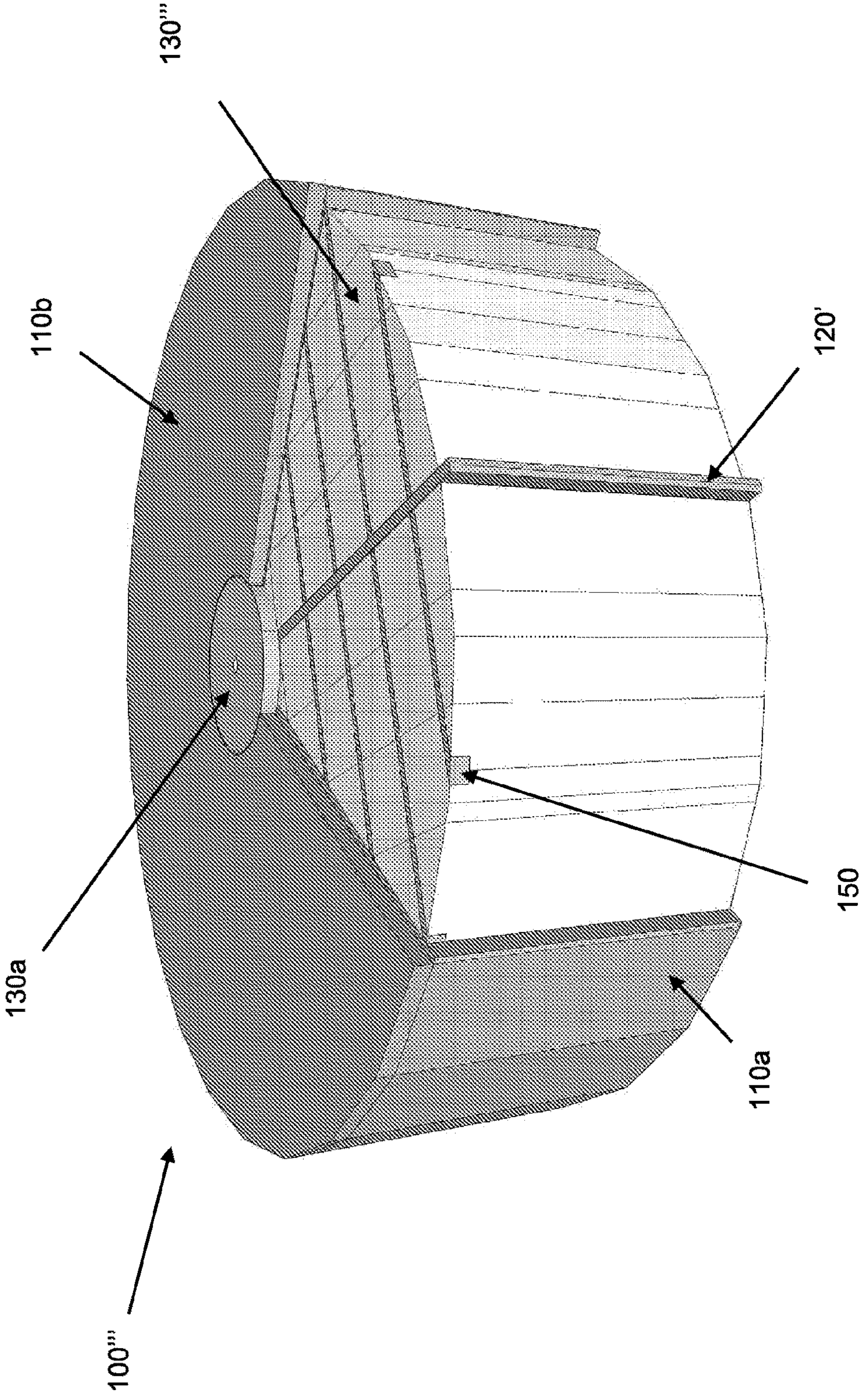
FIG. 8 shows an alternative embodiment of a round buoy with integral support walls extending radially from the center, rectangular buoyancy blocks and horizontal support beams.

FIG. 8 shows an alternative embodiment of a cylindrical buoy 100'" having support walls 120' extending radially from the center, and support beams 150 between rectangular buoyancy block assemblies 130'", perpendicular to the section walls 120, which are made by cutting the buoyancy blocks before the molding.

It should be realized that the same structures—described above can also be made without the shell bottom 110*c*, with the buoyancy blocks exposed to sea water. It should also be realized that the reinforcement can be a mix of fibers and steel plates, stay, wire or bars, and that the reinforcement can be made of any material commonly used for reinforcement of concrete.

It should also be realized that the buoyancy block assemblies could be provided with indentations, grooves or other features allowing the concrete or other supporting material to engage the surface of the buoyancy block assemblies, improving stability of the design. The same is true for the interaction between the pipe and the radially innermost buoyancy blocks and support walls, i.e., the center cylinder is preferably provided with radially protruding supports engaging the innermost buoyancy blocks and support walls. Also, the center cylinder has preferably the general design of the other embodiments.

An elongated buoy with two rows of PTO units has been shown in FIG. 3*b*. It will be appreciated that an elongated buoy can be combined with a single row of PTO units and also that two or more PTO units may share the same seabed foundation.

Certain embodiments or components or features of components have been noted herein as being "preferred" and some options as being "preferable" or the like and such indications are to be understood as relating to a preference of the applicant at the time this application was filed. Such embodiments, components or features noted as being "preferred" or "preferable" or the like are optional and are not required for implementation of the innovations disclosed herein unless otherwise indicated as being required, or specifically included within the claims that follow.

The invention claimed is:

1. A method of manufacturing a wave energy converter buoy attachable to a power take off unit by use of a link rope, wherein the power take off unit is connectable to a seabed foundation, the method comprising the following steps:

providing a mold, placing at least one attachment portion for the link rope in the mold, placing a plurality of buoyancy block assemblies in the mold, wherein at least some of the buoyancy block assemblies are placed with spaces between adjacent buoyancy block assemblies, and supplying supporting material in liquid form to the mold, wherein, when solidified, the supporting material forms an integral support structure in the spaces between buoyancy block assemblies, and wherein the buoyancy block assemblies comprise triangular and/or hexagonal buoyancy block assemblies.

2. The method according to claim 1, comprising the additional step of:

providing a shell bottom in the mold, wherein the step of placing a plurality of buoyancy block assemblies in the mold comprises fixing the buoyancy block assemblies to the shell bottom.

3. The method according to claim 1, wherein the supporting material additionally forms a shell on the side and/or top of the buoy.

4. The method according to claim 1, wherein the supporting material is concrete.

5. The method according to claim 1, wherein the buoyancy block assemblies are assembled from sub-blocks provided by cutting a rectangular block into 30/60/90 degrees angled triangular sub-blocks or into two 30/60/90 degree angled triangular sub-blocks and one equilateral triangular sub-block.

6. The method according to claim 1, wherein the buoyancy block assemblies are provided by cutting a rectangular block into a hexagon.

7. The method according to claim 1 wherein the buoyancy block assemblies are placed in the mold in a honeycomb pattern.

8. The method according to claim 1 wherein the buoyancy block assemblies are placed in the mold so that the at least one attachment portion is surrounded by at least some of the buoyancy block assemblies.

9. A method of manufacturing a wave energy converter buoy, comprising:

providing a mold, placing at least one attachment portion in the mold, placing a plurality of buoyancy block assemblies in the mold so that the at least one attachment portion is surrounded by at least some of the buoyancy block assemblies and with spaces provided between at least some adjacent buoyancy block assemblies, supplying supporting material in liquid form to the mold, wherein, when solidified, the supporting material forms an integral support structure in the spaces between adjacent buoyancy block assemblies, and wherein the buoyancy block assemblies are arranged in a honeycomb pattern.

10. The method according to claim 9 wherein the buoyancy block assemblies comprise triangular and/or hexagonal buoyancy block assemblies.

11. The method according to claim 9 wherein each buoyancy block assembly is adjacent to multiple other buoyancy block assemblies.

12. The method according to claim 9 wherein the at least one attachment portion includes a bell mouth opening with a channel with a gradually increasing diameter towards an open end thereof, and the at least one attachment portion is placed in the mold with the bell mouth opening at a bottom of the mold.

13. The method according to claim 9 wherein the supporting material is concrete and the buoy is formed in the mold with the concrete forming a shell having a buoy side wall, buoy top wall and a buoy bottom wall.

14. The method according to claim 9 which also includes providing a shell bottom in the mold, and wherein the step of placing the plurality of buoyancy block assemblies in the mold includes fixing the buoyancy block assemblies to the shell bottom.

15. A method of manufacturing a wave energy converter buoy, comprising:

providing a mold, placing at least one attachment portion in the mold, placing a plurality of buoyancy block assemblies in the mold in a honeycomb pattern wherein each of the plurality of buoyancy block assemblies is adjacent to multiple other of the buoyancy block assemblies, and with spaces provided between at least some adjacent buoyancy block assemblies, and supplying supporting material in liquid form to the mold, wherein, when solidified, the supporting material forms an integral support structure in the spaces between adjacent buoyancy block assemblies.

16. The method according to claim 15 wherein the at least one attachment portion is surrounded by multiple buoyancy block assemblies in the mold.

17. The method according to claim 15 wherein the buoyancy block assemblies comprise triangular and/or hexagonal buoyancy block assemblies.

* * * * *